Oct. 28, 1952 W. HEATH, JR 2,615,973
TEMPERATURE RESPONSIVE DETECTOR SYSTEM
Filed April 7, 1950 4 Sheets-Sheet 1

INVENTOR
WESTCOTT HEATH, JR.
BY Scrivener & Parker
ATTORNEYS

Oct. 28, 1952     W. HEATH, JR     2,615,973
TEMPERATURE RESPONSIVE DETECTOR SYSTEM
Filed April 7, 1950     4 Sheets-Sheet 2

INVENTOR
WESTSCOTT HEATH, JR.
BY Scrivener & Parker
ATTORNEYS

Oct. 28, 1952     W. HEATH, JR     2,615,973
TEMPERATURE RESPONSIVE DETECTOR SYSTEM
Filed April 7, 1950                                4 Sheets-Sheet 3
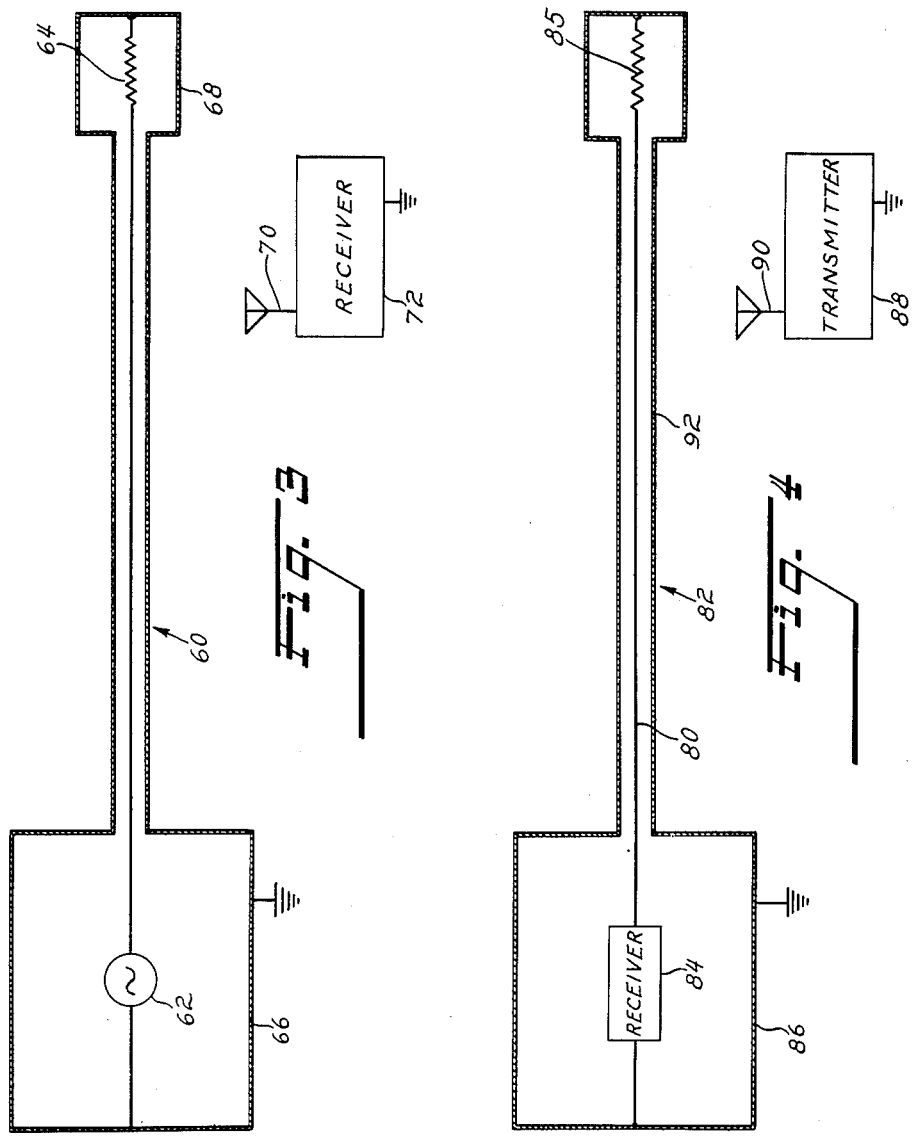
INVENTOR
WESTSCOTT HEATH, JR.
BY  *Scrivener & Parker*
                    ATTORNEYS INVENTOR
WESTSCOTT HEATH, JR.
BY Scrivener & Parker
ATTORNEYS Patented Oct. 28, 1952

2,615,973

UNITED STATES PATENT OFFICE 2,615,973

TEMPERATURE RESPONSIVE DETECTOR SYSTEM

Westcott Heath, Jr., Union City, N. J., assignor, by mesne assignments, to Samuel Scrivener, Jr., trustee of the Petcar Trust Application April 7, 1950, Serial No. 154,496

11 Claims. (Cl. 177—355)

This invention relates broadly to temperature sensitive devices and systems which are used as fire or overheat detectors and, more particularly, to a temperature sensitive device or system which depends for its operation on a marked temperature-responsive change in the shielding of electromagnetic radiations by certain base metals and their alloys due to the "Curie Temperature" effect.

A principal object of the invention has been to provide a temperature-responsive indicating system of the repeating type, embodying a continuous (i. e. cable-like) detector element, and which will be operative to provide an indication of the existence of a predetermined temperature at any point along the length of the element, while at the same time the system will be independent of the length of the element or of the overall ambient temperature.

A further object has been to provide a temperature-responsive indicating system of the described type, the set temperature response point of which is predetermined by the characteristics of a metal used in the detector element thereof, whereby any need of mechanical or other setting or calibration, during or after manufacture, is eliminated.

A still further object has been to utilize in a fire or overheat detector system the so-called known Curie effect of certain metals which occurs when magnetic materials are subjected to heat, causing a change to take place in the permeabilities of the materials. A temperature-permeability curve for a magnetic material shows that the material suddenly loses its magnetic properties when heated to a predetermined temperature. The temperature-permeability curve for a magnetic material has very steep portions in the region where the material ceases to be magnetic. The term Curie region is intended to cover that portion of a temperature permeability curve where a small change in temperature causes a large change in permeability. The Curie regions for different materials are in many cases widely separated. The Curie region for iron is high and a very high temperature is necessary to cause iron to lose its magnetic property. Certain alloys have been found to have relatively low Curie regions when compared with the Curie region of iron. Material composed of 30 per cent nickel and 70 per cent iron has been found to have a relatively low Curie region.

These and other objects are accomplished by my invention, and are believed to be a great contribution to the fire detector art, as the result is the elimination of certain objectionable features found in known types of fire detectors or overheat detectors, for example, drift of the set temperature point due to high or prolonged ambient temperature and errors in the alarm temperature when the ambient temperature approaches the range of the alarm temperature. For example, a very accurate response from a known resistance or thermistor type element in such a case would require a resistance-temperature response curve with a slope nearing infinity, which has been found to be impractical. Further, the dangerous false alarms now found to be prevalent with many present types of fire and overheat detectors are due in many cases to improper manual settings, calibration errors, metal creep due to repeated heat cycles, and mechanical failures of the setting mechanism due to vibration or mechanical wear, particularly in aircraft use. By this invention these deficiencies are eliminated for the reason that in the system which I have provided the temperature setting is made permanent by the use of a selected Curie metal on the characteristics of which the operation of the detector depends, and which does not change with time or ambient temperatures and is not subject to mechanical breakdown during its molecular changes of state at the Curie point. However, the utility and temperature range of this device are in no way impaired since an almost infinite range of Curie temperature points are available with present corrosion resistant alloys.

It is well known that the efficiency of radio frequency transmission lines, aircraft ignition wire shielding conduits, and shielding devices in general depend on the ability of the shield wall to contain the circulating currents inside the device and prevent their penetration of the walls. If penetration of the shield wall takes place to a greater or lesser degree some of the unconfined currents will complete their circulatory path outside the shield and will set up radiation fields of an electromagnetic nature which will of course defeat the purpose of the shield. In the case of a coaxial transmission line, power will be lost which should have been delivered to the load instead. In the case of ignition shielding a great deal of radio interference will result if the shield walls are incapable of confining the radiations.

With respect to the selection of a suitable metal for a shield wall the shielding effectiveness is a function of the resistance and permeability of the metal. The lower the resistance and the higher the permeability of a metal at a given frequency the better will be its shielding effectiveness. The above relationships are demonstrated by the following expressions for the depth of penetration of an electromagnetic field in a given metal.

The penetration distance $$d=\left(\frac{\lambda}{\pi\sigma\mu C}\right)^{1/2}$$

Where
$\lambda$=wavelength in empty space—meters
$\sigma$=conductivity of the material—mhos/meter
$\mu$=magnetic inductive capacity—henries/meter
$C$=velocity of light in empty space—meters/sec.

The above classic expression for the depth of penetration based on Maxwell's equations is well substantiated in the literature.

Substituting resistivity $\rho$ for $$\frac{1}{\sigma}$$

and $$f=\frac{C}{\lambda}$$

and $\mu$ in terms of a permeability ratio $\phi$ with empty space=1 (or unity) we may simplify the expression for our discussions as follows:

$$d \text{ is proportional to } \sqrt{\frac{\rho}{\phi f}}$$

This shows that the penetration distance $a$ increases with increasing resistance $\rho$ and decreases with increasing permeability $\phi$.

The effective increase in resistance with temperature of commonly used conductors such as copper, aluminum, brass, etc., with their increasing losses is well known. This relationship is fairly linear over most temperature ranges and results in poor shielding and power losses at elevated temperatures. This resistance effect is small when compared with the permeability effect, particularly in alloys having iron and nickel base metals. The relative permeability of conductors like copper, aluminum, brass, etc., is very close to the unit 1, for air and empty space. However, some of the alloys which have iron and nickel base metals may have permeability ratios of many hundreds or thousands to one at room temperature due to their magnetic properties. Since these values are so much larger, it has been my purpose to concentrate on the permeability factor in the shielding effect of metals. These magnetic metals also have a property known as the "Curie Temperature" which means that at some specific temperature or over a very small incremental range of temperature, they suddenly lose their magnetic properties and take on a permeability near unity. It can be readily determined from the above facts that there would be a marked change of great magnitude in the shielding effectiveness of these Curie metals at their "Curie point" temperatures since the permeability may change by a ratio of several thousand to one over some very small increment of temperature at the Curie point.

By this invention I take advantage however, of these long established principles concerning the radio shielding effectiveness of metals at elevated temperatures, which principles, when ordinarily applied to radio shielding and coaxial radio frequency line problems have always produced detrimental effects. In my invention, however, I have used these effects to produce a heat sensitive element which is independent of length and any cumulative ambient temperature effects, and which provides an indication of a predetermined temperature in a new manner and with advantageous results not found in known detectors and detector systems.

Accordingly I have provided a source of electromagnetic radiation and confined this source in a radiation shield formed from a so-called "Curie metal," it being understood that the source is preferably inside the shield, but may be outside it, as will appear hereinafter. The Curie metal is selected according to its transformation temperature, at which it changes from a magnetic to a non-magnetic state. The change in state of the metal when the selected alloy reaches the Curie temperature is determined by any one of a number of means for detecting electromagnetic radiation or changes in magnitude of such radiation. This intelligence may be transmitted by a suitable means to a signal device or a control. The frequency of the radiation may be selected at the option of the user and may be dependent on the magnetic properties of the alloy used and other design consideration.

Further objects and advantages of this invention will be evident after consideration of the following specification taken in conjunction with the attached drawings, in which:

Fig. 3 is a diagrammatic view of a system using an antenna and receiver to pick up radio frequency radiations appearing outside the shield;

Figure 5:
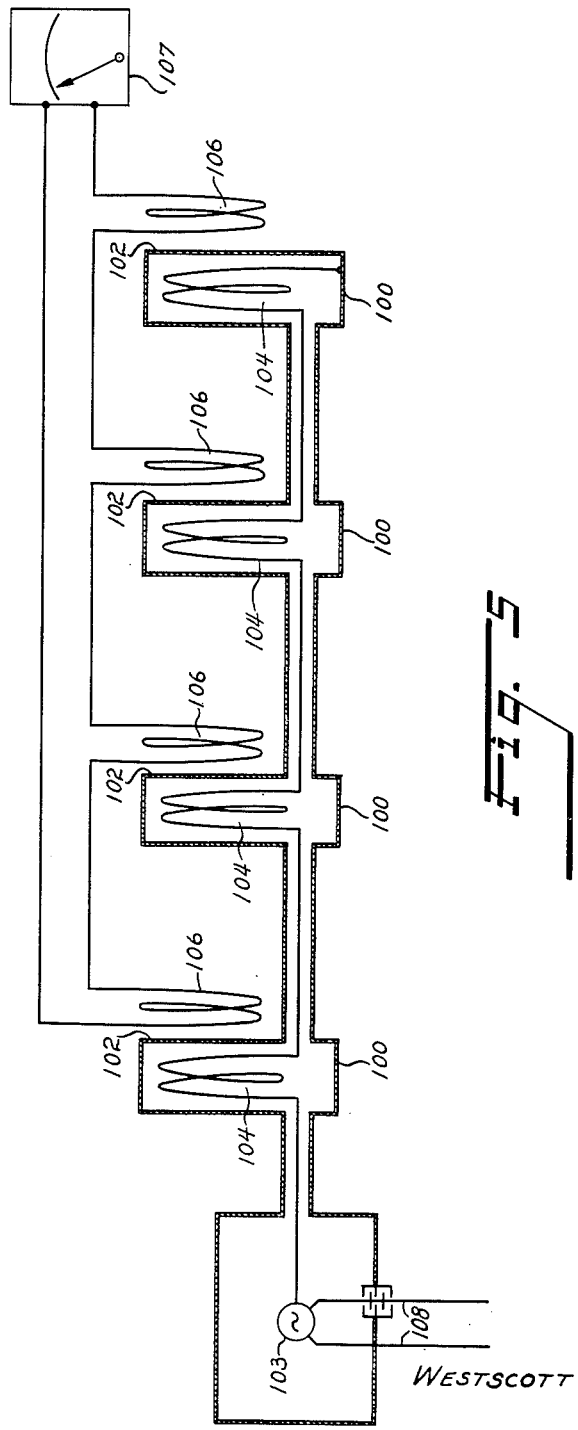

Fig. 4 is a diagrammatic view of a system in which the center conductor of a coaxial cable is operative as a shielded antenna and the detected radiations arrive from a source external to the shield, and Fig. 5 is a diagrammatic view of a system embodying a number of shielded elements which constitute the temperature sensitive devices, and also including means for detecting radiation from the elements.

Figure 1:
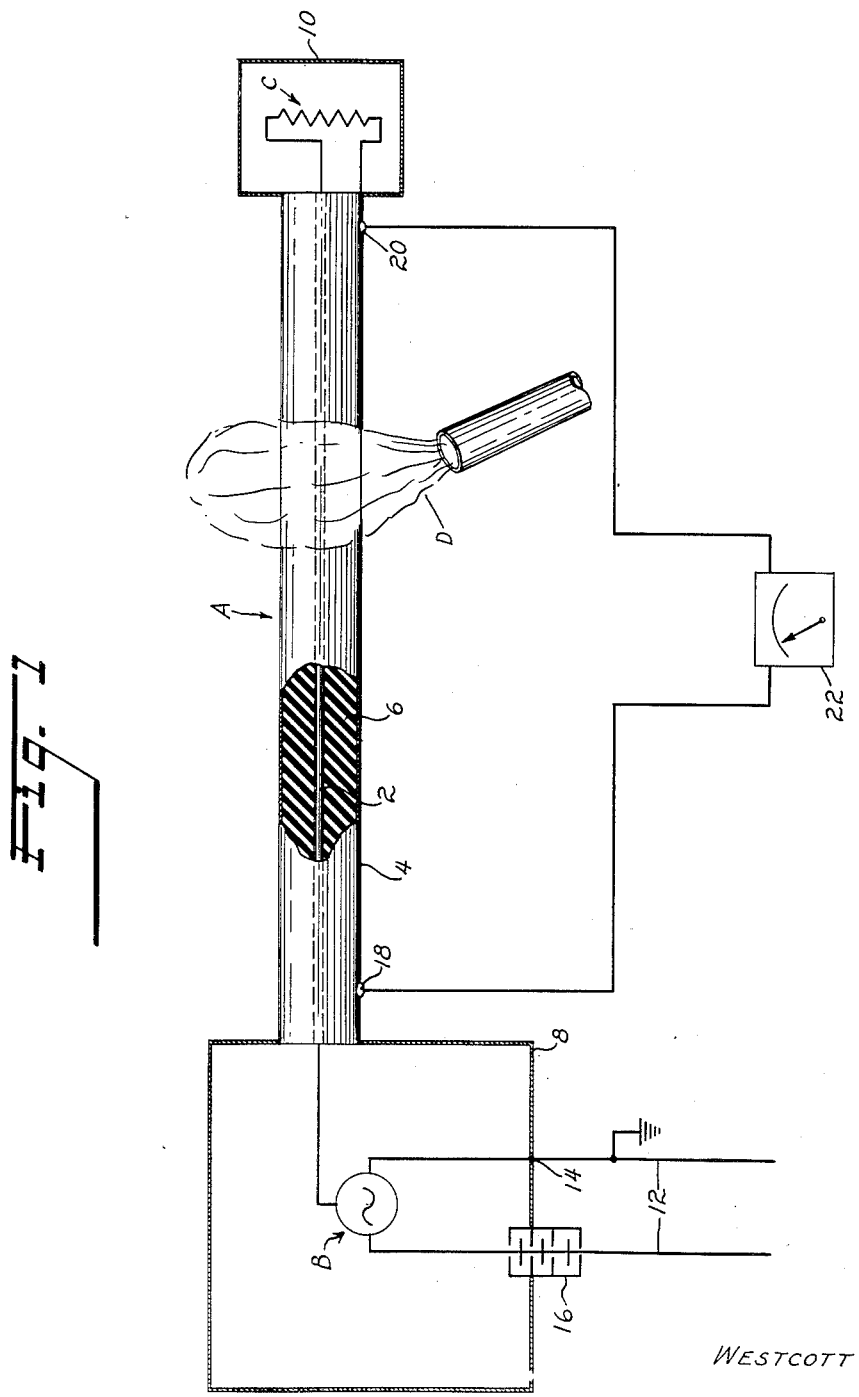
Fig. 1 is a diagrammatic view of a detector system according to my invention, embodying as a detector element a coaxial transmission line having an outer cover formed of a Curie metal as the temperature sensitive device, and using the voltage drop method of detecting the leakage radiation.

A preferred embodiment of my invention is disclosed in Fig. 1 and comprises a coaxial cable A, a source of radio frequency energy at the input end of the cable, and a load C at the output end of the cable. The coaxial cable comprises a central wire conductor 2 supported concentrically within a thin tubular shield 4 of Curie metal by high temperature insulation 6. The source B is connected to supply radio frequency energy to conductor 2 of the coaxial cable and is itself enclosed in a shield 8 of Curie metal which is bonded to the shield 4 of the cable. The load C is enclosed in a shield 10 of Curie metal which is bonded to that of the cable. Power, which may be A. C. or D. C. is supplied to the source B, through lines 12, one of which is connected to the source by grounding through the shield 8 at 14, the other line being connected directly to the source of radiation by passing through a "thru type" capacitive line filter 16. Filtering of this line may be modified to suit the particular design. The purpose of the filter is to prevent stray radiation thru the supply line from interfering with the operation of the heat detector but in no way should it be considered as part of this invention. The shield 8 for the source of radiations is grounded as shown at 14, while the shield 10 for the load is insulated from ground as is also the shield for the coaxial transmission line. At each end of the transmission line a lead is connected as at 18, 20. These leads are brought to an instrument 22 for measuring any alternating voltage drop along the coaxial line which will appear when leakage occurs thru the shield wall.

When a flame D or some other source of heat strikes the thin wall 4 of the coaxial transmission line A, the temperature of the wall rises and when it reaches the Curie point of the metal, which in a practical case may be 650 deg. F., considerable leakage of the confined radiation takes place. The leakage radiation travels over the outer surface of the coaxial line and causes a non-uniform voltage distribution so that some voltage gradient is measured between the points 18, 20 by the sensitive volt meter 22, which may or may not have electron tube amplification means. The load C on the end of the line may be any convenient value dependent on frequency and other circuit constants including the length of the line.

Figure 2:
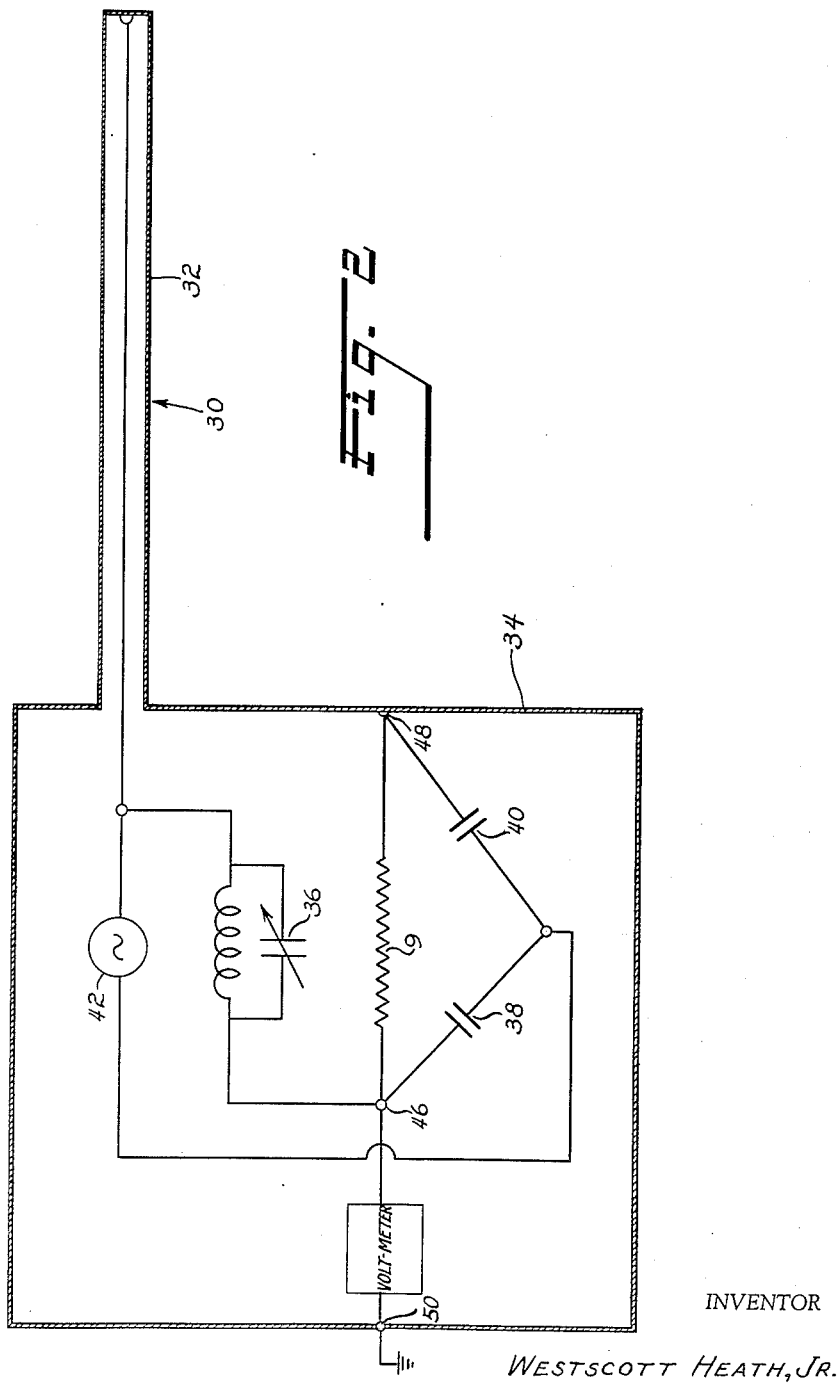
Fig. 2 is a diagrammatic view of a system using a balanced bridge circuit for detection of the leakage radiation.

In Fig. 2, is shown another form of the invention wherein all of the circuits are confined to one central housing except for the coaxial line 30, the shield 32 of which is connected to the shield 34 of the circuits and becomes an integral part thereof. A voltage bridge is provided wherein the impedance of the shorted coaxial line 30 and a variable impedance 36 becomes two of the equal arms and the other two equal arms are formed by condensers 38 and 40. A source of radio frequency 42 supplies voltage to the bridge so formed and balancing of the bridge is accomplished by use of the variable capacity 36 to compensate for any length of coaxial line. Unbalance will be caused by leakage from the coaxial shield 32 on heating thereof to the Curie temperature of the metal of the shield because the effective impedance of the tuned line will change in such case. Detection of this unbalance is made by observing a potential change across resistor 44 at points 46, 48 with use of a suitable vacuum tube volt meter 50 or some sensitive electronic device for detecting small changes in voltage. The operation is essentially as before described. Note that point 48 is in essence connected to point 50 by reason of the shield wall.

In Fig. 3 is shown another form of the invention using the coaxial line with a remote means for detecting the presence of flame or overheating. The coaxial line 60 is connected to a source of radiation 62 and is provided with a suitable load 64 at the termination end in much the same manner as in Fig. 1. The source of radiation is confined in shield 66 and the load in shield 68. However, in this case radiation from the coaxial line is picked up by antenna 70 which is connected to a sensitive receiver 72.

The form of invention disclosed in Fig. 4 is essentially the reverse of that disclosed in Fig. 3 and in this modification the inner conductor 80 of coaxial cable 82 becomes the antenna of radio receiver 84 which is confined within the shield 86. A shielded load 85 is provided in the usual manner.

An external source of radiations 88 is provided with an antenna 90 to set up a radio frequency field around the coaxial line. Operation is obtained when the Curie metal of the coaxial line shield 92 reaches the critical temperature and a radio frequency field is set up inside the coaxial line 82 and couples to the receiver 84 by means of antenna conductor 80.

In Fig. 5 is shown another form of the invention wherein any suitable number of temperature sensitive units 100 each having Curie metal walls 102 may be supplied by a source of radiation 103 which feeds the inductive coils 104 which are all confined by shield walls 102 in such a manner that coupling between radiation coils 104 and pick up coils 106 can only take at some predetermined temperature. Indication of the critical temperature is observed on the sensitive meter 107 which is connected in series with all of the pick up coils 106. A radio receiver with antenna may also be used for signal pick up from any of the coils 104. Power may be supplied to the source of radiation 103 by the power leads 108 in the same manner described in connection with Fig. 1.

It is understood that the disclosed embodiments of the invention are only representative of many forms which it may take and in no way limit the invention, which is limited only by the following claims.

What is claimed is:

1. A temperature sensitive system for providing an indication of increase of an ambient temperature to a predetermined value, comprising a source of radio frequency energy, means responsive to radiation from said source to provide an indication, means disposed between said source and said responsive means which are magnetic at temperatures below said predetermined value to thereby shield the responsive means from radiation from the source and which become non-magnetic at and above said predetermined temperature value to permit radiation from the source to reach said responsive means.

2. A temperature sensitive system for providing an indication when an ambient temperature increases to a predetermined value, comprising a source of radio frequency energy, a conductor connected to said source to radiate energy received therefrom, shielding means surrounding said conductor and being magnetic at temperatures thereof below said predetermined temperature to confine the radiation field of said conductor and becoming non-magnetic at and above said predetermined temperature to remove said confining effect, and means for detecting such radiation to determine the existence of said predetermined temperature at said shielding means.

3. A system according to claim 2, in which the means for detecting the radiation comprises means for determining the voltage drop between linearly spaced points of said shielding means.

4. A system according to claim 2, comprising in addition a load connected to the output end of said conductor.

5. A system according to claim 4, comprising in addition radiation shielding means surrounding said source and said load.

6. A system according to claim 2, in which the means for detecting the radiation comprises a receiver located externally to said shield means and tuned to receive radiations emanating from said conductor.

7. A temperature sensitive system for providing an indication of increase of an ambient temperature to a predetermined value, comprising a source of radio frequency energy, means for receiving and detecting radiation from said source, and shielding means disposed between said source and said receiving and detecting means which are magnetic at temperatures below said predetermined temperature to thereby shield said receiving and detecting means from said radiation and which become non-magnetic at said predetermined temperature to thereby remove said shielding effect.

8. A system according to claim 7, in which the source of energy comprises a wire conductor, the shielding means comprises a tubing surrounding the conductor throughout its length, and the receving and detecting means is external to the shielding means.

9. A system according to claim 7, in which the receiving and detecting means comprises a receiver having an antenna in the form of a wire conductor, the shielding means comprises a tubing surrounding the conductor throughout its length, and the source of radio frequency energy is external to the shielding means.

10. A temperature sensitive system for providing an indication of increase of an ambient temperature to a predetermined value, comprising a source of radio frequency energy, a wire conductor connected to be supplied with energy from said source, shielding means surrounding said conductor and being subject to the ambient temperature and being magnetic at temperatures below said predetermined value to thereby contain radiation from said conductor and becoming non-magnetic at and above said predetermined value to thereby permit radiation from said conductor, a Wheatstone bridge circuit including said wire conductor and being balanced under conditions obtaining at temperatures below said predetermined value and becoming unbalanced at temperatures at and above said predetermined value, and means for indicating an unbalanced condition of said bridge circuit.

11. A temperature sensitive system for providing an indication of increase of an ambient temperature to a predetermined value, comprising a source of radio frequency energy, a plurality of coils connected in series to said source and providing means for radiating energy supplied thereby, said coils being spatially separated and each being subject to the ambient temperature being monitored, an indicating circuit comprising a plurality of connected coils each located inductively with respect to one of the radiating coils and means for indicating flow of current in said circuit, shielding means disposed between each pair of inductively coupled coils and being magnetic at temperatures below said predetermined value to prevent inductive coupling of said coils and becoming non-magnetic at temperatures at and above said predetermined value to permit such coupling and thereby operate the indicating means.

WESTCOTT HEATH, Jr.

REFERENCES CITED

The following references are of record in the file of this patent:

UNITED STATES PATENTS

| Number | Name | Date |
|---|---|---|
| 1,321,347 | Wild et al. | Nov. 11, 1919 |
| 2,431,352 | Theillaumas | Nov. 25, 1947 |

FOREIGN PATENTS

| Number | Country | Date |
|---|---|---|
| 885,262 | France | May 24 1943 |